US008745002B2

(12) United States Patent
Ozdemir et al.

(10) Patent No.: US 8,745,002 B2
(45) Date of Patent: Jun. 3, 2014

(54) MOUNTING APPLICATIONS ON A PARTIALLY REPLICATED SNAPSHOT VOLUME

(75) Inventors: Kadir Ozdemir, San Jose, CA (US); James Cross, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 234 days.

(21) Appl. No.: 12/700,664

(22) Filed: Feb. 4, 2010

(65) Prior Publication Data

US 2011/0191295 A1    Aug. 4, 2011

(51) Int. Cl.
*G06F 17/30* (2006.01)

(52) U.S. Cl.
USPC ...................................................... 707/639

(58) Field of Classification Search
USPC ...................................................... 707/639
See application file for complete search history.

(56) References Cited

U.S. PATENT DOCUMENTS

| 6,014,669 | A | | 1/2000 | Slaughter et al. | |
|---|---|---|---|---|---|
| 6,038,639 | A | * | 3/2000 | O'Brien et al. | 711/114 |
| 6,560,614 | B1 | * | 5/2003 | Barboy et al. | 707/611 |
| 7,149,858 | B1 | | 12/2006 | Kiselev | |
| 7,188,128 | B1 | | 3/2007 | Nagaraj et al. | |
| 7,194,487 | B1 | | 3/2007 | Kekre et al. | |
| 7,254,682 | B1 | | 8/2007 | Arbon | |
| 7,266,652 | B1 | | 9/2007 | Hotle et al. | |
| 7,373,520 | B1 | | 5/2008 | Borthakur et al. | |
| 7,565,419 | B1 | | 7/2009 | Kwiatkowski et al. | |
| 7,774,444 | B1 | | 8/2010 | George et al. | |
| 7,797,357 | B1 | | 9/2010 | Nagaraj et al. | |
| 7,886,119 | B1 | | 2/2011 | Cameron et al. | |
| 7,917,855 | B1 | | 3/2011 | Satish et al. | |
| 2003/0159007 | A1 | * | 8/2003 | Sawdon et al. | 711/154 |
| 2006/0123209 | A1 | * | 6/2006 | Borland | 711/162 |
| 2006/0123211 | A1 | | 6/2006 | Derk et al. | |
| 2006/0155946 | A1 | * | 7/2006 | Ji | 711/162 |
| 2006/0206677 | A1 | | 9/2006 | Kim et al. | |
| 2007/0006018 | A1 | | 1/2007 | Thompson et al. | |
| 2007/0033356 | A1 | | 2/2007 | Erlikhman | |
| 2007/0180307 | A1 | * | 8/2007 | Zohar et al. | 714/6 |
| 2007/0185938 | A1 | * | 8/2007 | Prahlad et al. | 707/204 |
| 2008/0104360 | A1 | | 5/2008 | Takeuchi et al. | |
| 2008/0162590 | A1 | * | 7/2008 | Kundu et al. | 707/202 |
| 2009/0187704 | A1 | | 7/2009 | Rodgers | |
| 2009/0327568 | A1 | * | 12/2009 | Wayda et al. | 710/306 |
| 2009/0327628 | A1 | * | 12/2009 | Narayanan et al. | 711/162 |
| 2010/0030959 | A1 | | 2/2010 | Satoyama et al. | |

OTHER PUBLICATIONS

Non-Final Office Action Mail Date Dec. 20, 2011; U.S. Appl. No. 12/608,892.

(Continued)

*Primary Examiner* — William Spieler
(74) *Attorney, Agent, or Firm* — Wilmer Cutler Pickering Hale and Dorr LLP

(57) ABSTRACT

A partial replication step shot method. The method includes receiving a first snapshot at a first time from a replication source and receiving a set of data objects from the replication source that have been modified during a time period between the first time and a subsequent second time. A second snapshot is generated at the second time on the replication source by using the set of data objects. An application is mounted onto the second snapshot prior to the set of data objects being received to completion.

20 Claims, 10 Drawing Sheets

(56) References Cited

OTHER PUBLICATIONS

Final Office Action Mail Date May 16, 2012; U.S. Appl. No. 12/608,892.
Non-Final Office Action Mail Date Mar. 28, 2012; U.S. Appl. No. 12/697,074.
Non-Final Office Action Mail Date Apr. 24, 2012; U.S. Appl. No. 12/827,911.
Non-Final Office Action Mail Date May 8, 2012; U.S. Appl. No. 12/619,495.
Symantec Corporation, "Veritas™ Volume Replicator Administrator's Guide, Solaris, 5.0 Maintenance Pack 3", 2008, Symantec Corporation, Cupertino, California, USA.
Symantec Corporation, "Veritas™ Volume Manager Administrator's Guide, Solaris, 5.0 Maintenance Pack 3", 2008, Symantec Corporation, Cupertino, California, USA.

* cited by examiner

US 8,745,002 B2

MOUNTING APPLICATIONS ON A PARTIALLY REPLICATED SNAPSHOT VOLUME

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Periodic replication is one technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. In addition to disaster recovery, the replicated data enables a number of other uses, such as, for example, data mining, reporting, testing, and the like. In this manner, the replicated data copy ensures data integrity and availability. Additionally, periodic replication technology is frequently coupled with other high-availability techniques, such as clustering, to provide an extremely robust data storage solution.

Performing a replication operation, backup operation, or the like on a large data set may take a significant amount of time to complete. The sheer size of the data set makes a replication operation take a significant amount of time. During this time, if the data set is maintained live, a problem with intervening accesses to the data set will have to be addressed. For example, on a large enterprise class system, there may be thousands of writes to that data set while it is being backed up or replicated. This factor can create data corruption hazards.

One approach to safely backing up live data is to temporarily disable write access during the backup, for example, by configuring a locking API provided by the file system to enforce exclusive read access. Such an approach might be tolerable for low-availability systems (e.g., desktop computers and small workgroup servers, where regular downtime is acceptable). Enterprise class high-availability 24/7 systems, however, cannot bear service stoppages.

A snapshot, or checkpoint, operation is often used to avoid imposing downtime. To avoid downtime, a high availability system may instead perform the replication or backup on a snapshot, which is essentially a read-only copy of the data set frozen at a point in time, and allow applications to continue writing to their data. Thus the term snapshot is used to refer to the data as they were at a particular point in the past.

Data storage required for applications such as file systems and databases are typically allocated from one or more storage devices that are maintained as a "volume". The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

Applications such as file systems and databases cannot be mounted on the replica volumes while these volumes are being synchronized since the synchronization process changes the volume blocks without the knowledge of the applications. If the data read into memory by applications becomes inconsistent with the on-disk image updated by the synchronization process, the applications will treat these volumes as corrupted. If the replica volumes are writable then the application and synchronization process can update the same block independently, which leads to real data corruption. For this reason, applications are mounted on frozen images (i.e., snapshots) of the replica volumes.

Traditionally, the applications on the secondary site have to wait for the replica to be fully synchronized to the secondary site before using the replica. One way of implementing periodic replication is to take the snapshots of the volumes periodically on the primary site and replicate these snapshots to the secondary site. When the snapshot is fully replicated, the applications can be mounted. For very large replicas, the time lag can be significant enough to lead to idling resources and delaying services at the secondary site, and possibly losing revenue opportunities. Therefore, it is very desirable to have a method that allows applications to be mounted on the replicated snapshot volumes as quickly as possible even if these snapshot volumes are not fully replicated. What is needed is a method to reduce the time required to make snapshot volumes available to secondary sites.

SUMMARY OF THE INVENTION

Embodiments of the present invention provide a method for replicating snapshot volumes to reduce the application downtime by mounting applications on replicated copies of snapshot volumes as quickly as possible.

In one embodiment, the present invention is implemented as a partial replication snapshot method. The method includes receiving a first snapshot at a first time from a replication source and receiving a set of data objects from the replication source that have been modified during a time period between the first time and a subsequent second time. A second snapshot is generated at the second time on the replication source by using the set of data objects. An application is mounted onto the second snapshot prior to receiving the set of data objects in their entirety.

In one embodiment, upon receiving a read request from the application to access one of the set of data objects and the one data object is not resident with the second snapshot, the one data object is retrieved from the first snapshot.

In one embodiment, upon receiving a read request from the application to access one of the set of data objects and said one data object is yet to be transferred by the replication source, the one data object is received from the replication source via an out of order transfer.

In one embodiment, write accesses from the application to the one data object are implemented by using a writable snapshot of the second snapshot.

In one embodiment, read accesses from the application to the one data object are paused until the one data object is retrieved from the first snapshot.

In one embodiment, metadata is used to identify the set of data objects from the replication source that have been modified.

In one embodiment, the metadata comprises changed block address ranges.

In one embodiment, metadata describing the set of data objects is received prior to receiving the set of data objects in their entirety.

In one embodiment, a third snapshot is generated and an application is mounted on the third snapshot prior to completion of the replication of the third snapshot.

In one embodiment, the present invention is implemented as a computer readable storage medium having stored thereon, computer executable instructions that, if executed by a computer system cause the computer system to perform a method that includes receiving a first snapshot at a first time from replication source, and receiving a set of data objects from the replication source that have been modified during a time period between the first time and a subsequent second time. A second snapshot is generated at the second time on the replication source by using the metadata. An application is then mounted onto the second snapshot prior to receiving the set of data objects in their entirety.

In one embodiment, the present invention is implemented as a volume replication system. The system includes a computer system having a processor coupled to a computer readable storage media and executing computer readable code which causes the computer system to implement a checkpoint manager module. The checkpoint manager module receives a first snapshot at a first time from a replication source, and receives a set of data objects from the replication source that have been modified during a time period between the first time and a subsequent second time. The module generates a second snapshot at the second time on the replication source by using the set of data objects, and allows an application to use the second snapshot prior to the set of data objects being received to completion.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
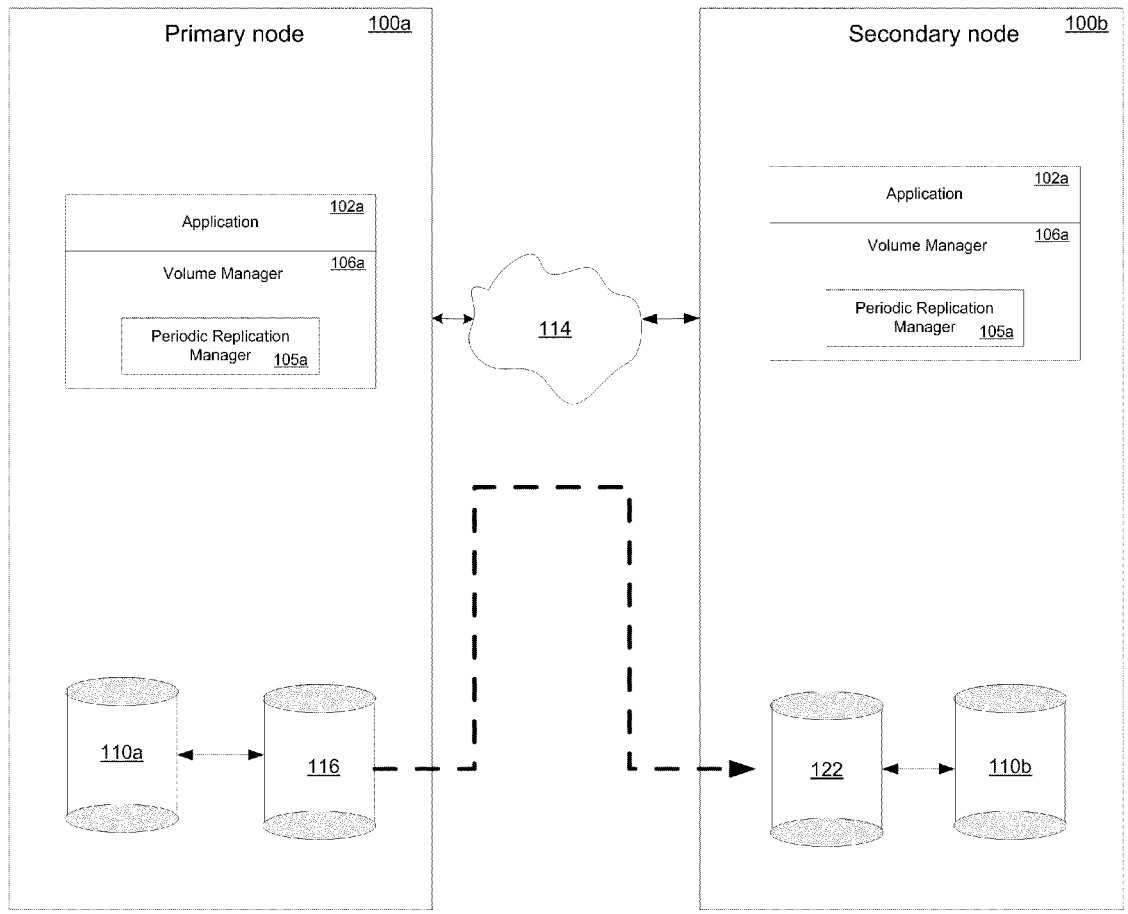
FIG. 1 illustrates a periodic replication operation within a replication system environment according to one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention provide a solution that enables the mounting of one or more applications on a volume undergoing replication even though the actual replication process is underway and is not yet complete. For example, in a typical scenario, as a primary site undergoes a replication process to a secondary site, changed data blocks are being sent from the primary site to the secondary site. The terms primary site and replication source are generally synonymous. Similarly, the terms secondary site and replication destination are generally synonymous. Embodiments of the present invention advantageously send information about the set of changed block address ranges (e.g., metadata) to the secondary site early during the replication process. This metadata enables the secondary site to mount one or more applications onto the unfinished replicated volume. The secondary site can then monitor the execution of the one or more applications and notify primary site when an application attempts to read blocks that have changed but have not yet been received from the primary site. Upon receiving this notification, the primary site can implement an out of order transfer and transfer the requested blocks ahead of the others. A typical replication process is now described in the discussions of FIG. 1 below.

FIG. 1 illustrates a periodic replication operation within an exemplary replication system environment according to one embodiment of the present invention. In the illustrated embodiment, copies of incrementally modified or changed data of a primary volume (v) on which a primary file system is mounted within primary node 100a are transferred to a replicated secondary volume (vr) on which a secondary file system is mounted" within a secondary node 100b periodically. To maintain the accessibility of the primary volume, a point-in-time "snapshot" volume (sv) is created and the periodic replication is performed using the snapshot volume. Similarly, to maintain the accessibility of the secondary volume, a point-in-time "snapshot" volume (rsv) is created and used at the secondary node 100b to receive incremental changes from the primary node 100a and to restore the replicated secondary volume.

In the replication system of the illustrated embodiment, a primary node 100a is coupled to a secondary node 100b via a network 114 (e.g., an IP network, LAN, WAN, or other communication link). Primary node 100a and secondary node 100b of the illustrated embodiment each respectively includes an application 102, a volume manager 106 and a periodic replication manager 105 as shown. In one embodiment, the functionality for managing the creation of snapshots and the mounting of applications on partially replicated snapshots is implemented by the periodic replication manager 105.

The FIG. 1 embodiment is initialized via the use of an initial synchronization. During the initial synchronization, the contents of a primary volume 110a (v) within primary node 100a are transferred to a replicated secondary volume 110b (vr) within the secondary node 100b. Subsequently, the one or more applications continue running and updating their state data on the primary volume 110a. At a later time, a replication process is initiated. At the later time, a point-in-time "snapshot" volume 116 (sv) is created. The snapshot volume 116 is then used to produce a replicated secondary volume 122 at the secondary node.

It should be noted that although the volumes 110a, 110b, 116 and 122 are illustrated as residing within the enclosures of the primary node 100a and the secondary node 100b (e.g., disk drives, solid-state disks, or the like), the volumes can reside outside the enclosures and can be accessed via network and/or bus connections (e.g., ethernet, fiber channel, etc.).

Figure 2:
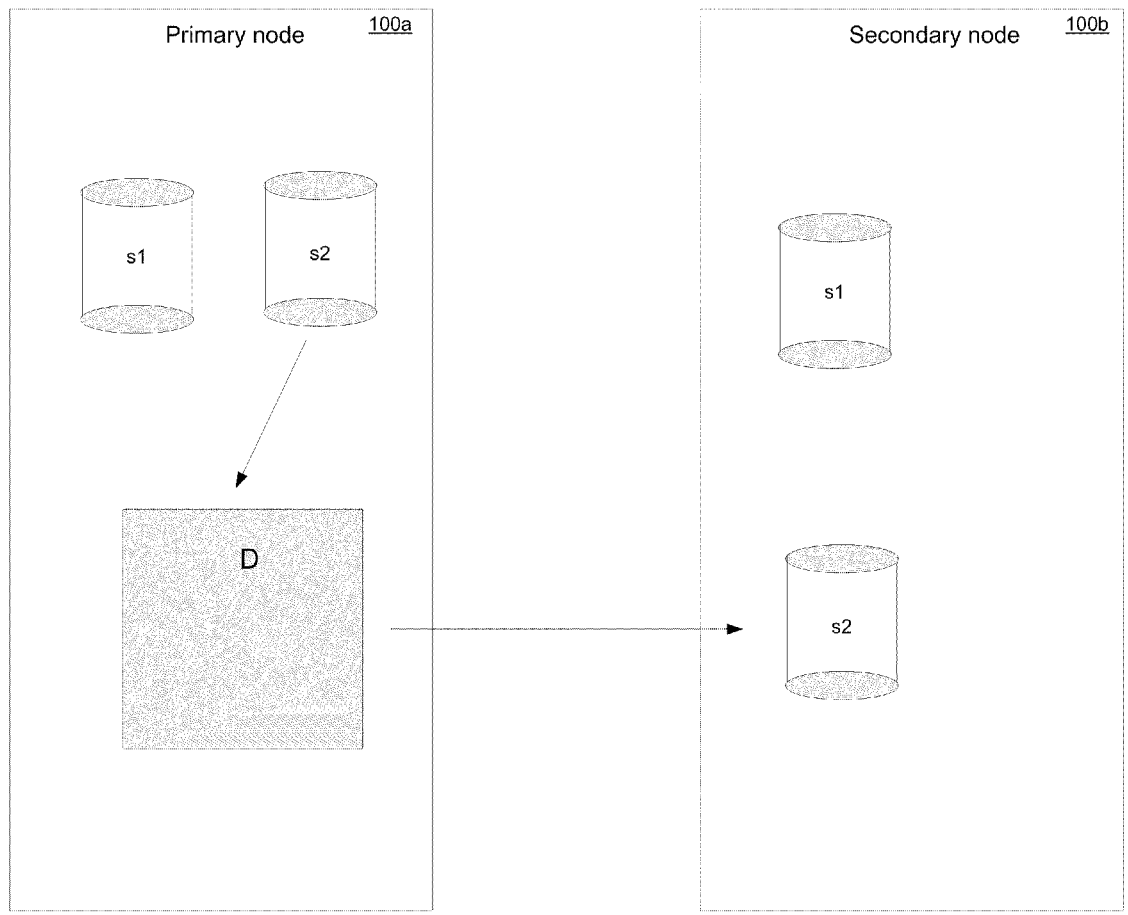
FIG. 2 shows a periodic replication operation as implemented between the primary node and the secondary node including snapshots s1 and s2 in accordance with one embodiment of the present invention.

FIG. 2 shows a periodic replication operation as implemented between the primary node (e.g., at the primary site) and the secondary node (e.g., at the secondary site) including snapshots s1 and s2 in accordance with one embodiment of the present invention.

As described above, embodiments of the present invention implement functionality that enables a secondary site to make snapshots of one or more storage objects (e.g., one or more volumes, etc.) available to the applications at a secondary site before fully replicating them. Advantageously, this allows secondary site applications to mount and run on these snapshot volumes almost immediately after these volumes are created on the primary site. This attribute provides near real-time mount operation on snapshot volumes at secondary sites.

Conventionally, applications such as file systems and databases are not mounted on the replica volumes while these volumes are being synchronized since the synchronization process changes the volume blocks without the knowledge of the applications. For example, if the data read into memory by applications becomes inconsistent with the on-disk image updated by the synchronization process, the applications will treat these volumes as corrupted. If the replica volumes are writable then the application and synchronization process can update the same block independently, which leads to real data corruption. For this reason, as described above, applications are mounted on frozen images (i.e., snapshots) of the replica volumes.

Embodiments of the present invention advantageously make a productive utilization of the time it takes to transfer application data from the primary node to the secondary node. For example, in the FIG. 2 scenario, D is the set of blocks that change between snapshot s1 taken at time t1 and snapshot s2 taken at time t2 on the primary site. Let s1 be fully replicated to a secondary site. Conventionally, the applications on the secondary site have to wait for s2 to be fully synchronized to the secondary site by a state of art replication solution before using s2. When s2 is fully replicated, say at time t3, the applications can be mounted on s2. The difference between t3 and t2 depends on the size of D and the replication transfer rate (e.g., the bandwidth of the communications link between the primary node and the secondary node) which in turn depends on the available replication throughput and the load on the primary and replica systems. The time lag can be large enough to lead to idling resources and delaying services on the secondary site, and possibly losing revenue opportunities.

Embodiments of the present invention advantageously utilize the characteristic, whereby the applications running on s2 on the secondary node may not need to read the changed blocks immediately, or may need to read a small subset of them. For example, a file system may need to read just the superblock and a small set of other blocks referenced by the superblock during the mount operation. The application running on the volume may mostly read the blocks that are not in D initially. Embodiments of the present invention advantageously implement functionality that allows applications to be mounted on the replicated snapshot volumes as quickly as possible, even if these volumes are not fully replicated.

Figure 3:
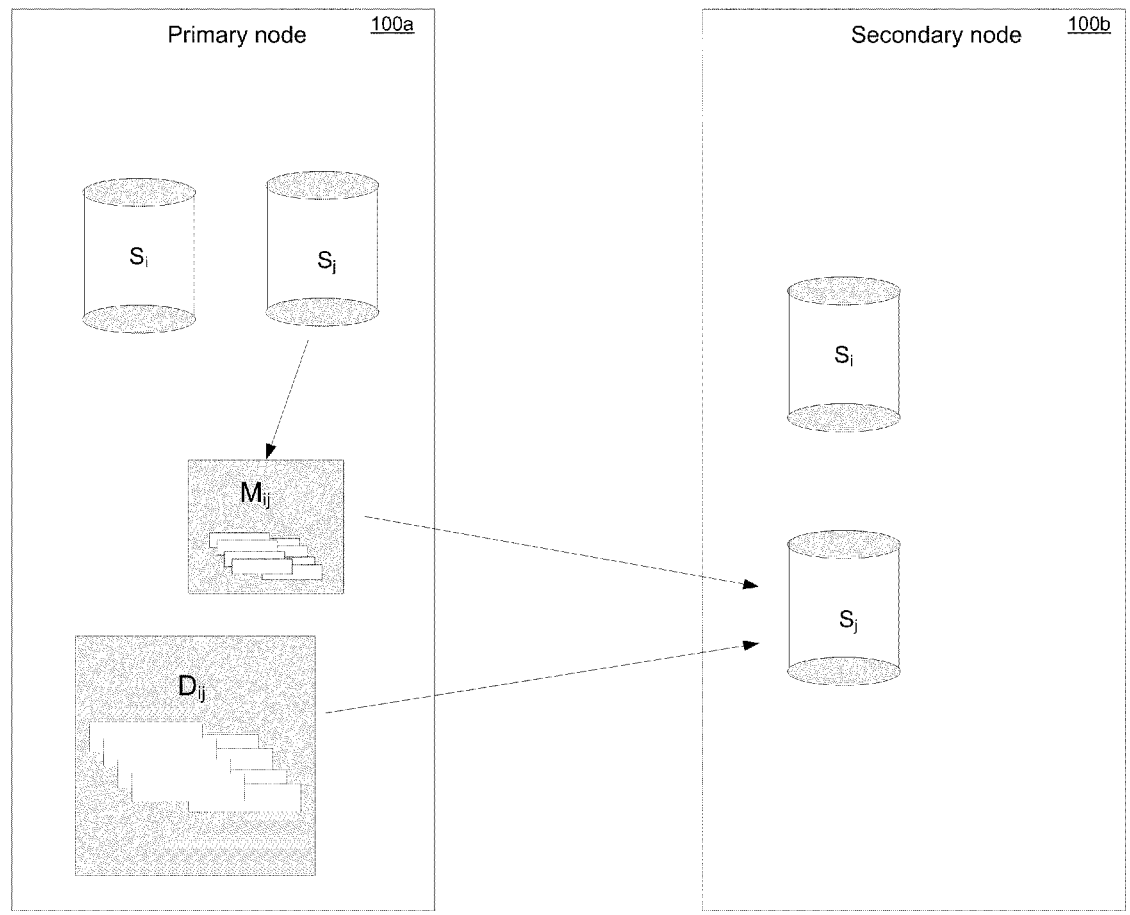
FIG. 3 shows a diagram depicting a partial replication operation as implemented between the primary node and the secondary node in accordance with one embodiment of the present invention.

FIG. 3 shows a diagram depicting a partial replication operation as implemented between the primary node and the secondary node in accordance with one embodiment of the present invention.

As depicted in FIG. 3, the primary node and the secondary node implement a solution that enables the mounting of one or more applications on a volume undergoing replication even though the actual replication process is underway and is not yet complete. For example, as the primary node undergoes a replication process to a secondary node, changed data blocks comprising D are being sent from the primary node to the secondary node. Embodiments of the present invention advantageously send information about the set of changed block address ranges (e.g., metadata) to the secondary site early during the replication process. This metadata enables the secondary node to mount one or more applications onto the unfinished replicated volume. The secondary site can then monitor the execution of the one or more applications and notify the primary site when an application attempts to read blocks that have changed but have not yet been received from the primary site. Upon receiving this notification, the primary site can implement an out of order transfer and transfer the requested blocks ahead of the others.

In the FIG. 3 embodiment, $s_i$ and $s_j$ are the snapshots taken at time $t_i$ and $t_j$, respectively, and $M_{ij}$ is the set of block addresses whose blocks are updated between time $t_i$ and $t_j$, where $j>i$. Let $D_{ij}$ be the set of data blocks (i.e., the content) referred by $M_{ij}$. $M_{ij}$ can be derived from $D_{ij}$. For example, $D_{ij}$ can be implemented as a stream of change records each of which contains an address, length, and data field whereas $M_{ij}$ can be stream of change records each of which contains an address and length field. It should be appreciated that the number of bytes required to store or transfer for $M_{ij}$ can be easily three orders of magnitude smaller than that for $D_{ij}$. Therefore, $M_{ij}$ can be transferred quickly to a secondary site. In one embodiment, a snapshot volume $s_j$ is defined as partially replicated if $M_{ij}$ is replicated but $D_{ij}$ is not.

After snapshot $s_j$ is taken at the primary node, the primary first transfers $M_{ij}$ and then $D_{ij}$ to the secondary node. Having $s_i$ and $M_{ij}$, the secondary node can allow applications to mount on $s_j$ immediately while the primary is still transferring $D_{ij}$.

In one embodiment, the secondary node updates $M_{ij}$ dynamically by removing the block ranges corresponding to blocks that are successfully received from the primary site. The $M_{ij}$ at the secondary node represents the set of block addresses for which the blocks are updated between $t_i$ and $t_j$ but have not yet been replicated. When $M_{ij}$ becomes empty, $s_j$ becomes fully replicated.

When an application at the secondary site issues a read request on a block address range on $s_j$ which is in $M_{ij}$, the secondary sends a notification to the primary which then sends the requested blocks to the secondary immediately and removes them from $D_{ij}$. In one embodiment, it is assumed that the application can tolerate the latency of transferring blocks over the replication network. The application read request on a block address range which is not in $M_{ij}$ and not in $s_j$ is satisfied by redirecting the read request to $s_i$.

In one embodiment, a new snapshot of a group of volumes can be taken at the primary while the previous snapshot of this group is being replicated. For example, to support such a scenario, the new snapshot (e.g., $s_k$) can be started while $s_j$ is still being replicated. The primary does not need to wait for $s_j$ to be fully replicated in order start replicating $s_k$. Instead, the primary can immediately transfer $M_{jk}$ to the secondary which enables the secondary to make $s_k$ available to its applications after it receives $M_{ij}$ and $M_{jk}$ completely. Following $M_{jk}$, the primary can start transferring $D_{jk}$ while the transfer of $D_{ij}$ is in progress. At the secondary site, snapshot $s_j$ serves the read requests from $s_k$ in the same way as it serves the application read requests.

Thus, embodiments of the present invention allow applications to be mounted on a chain of snapshots at a secondary node as long as the metadata for these snapshots has been already transferred to the secondary site.

It should be noted that in the above description, the snapshot $s_j$ is replicated after it is created at the primary node. However, the replication data ($D_{ij}$) for this snapshot is accumulated from time $t_i$ to $t_j$. This means that the primary can send $D_{ij}$ while it is accumulated starting at $t_i$. At time $t_j$ (i.e., after snapshot $s_j$ is created), the primary stops replicating $D_{ij}$ and start replicating $M_{ij}$ which identifies the set of blocks in $D_{ij}$ which remain to be replicated. When $M_{ij}$ is transferred completely, the applications at the secondary site can be mounted on $s_j$ and the transfer of $D_{ij}$ is resumed.

Figure 4:
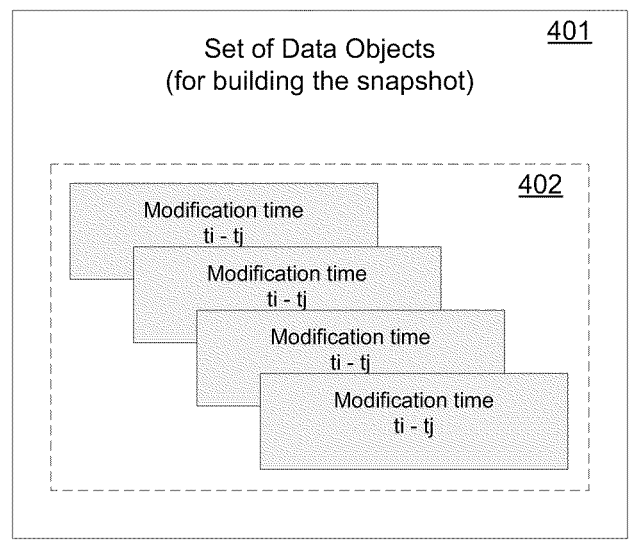
FIG. 4 shows a diagram of a set of data objects as used for building a snapshot in accordance with one embodiment of the present invention.

FIG. 4 shows a diagram of a set of data objects 401 (e.g., $D_{ij}$) as used for building a snapshot in accordance with one embodiment of the present invention. As described above, in an example where a snapshot $s_i$ is taken at time $t_i$ (e.g., a first-time) on a replication source, and another snapshot $s_j$ is taken at time $t_j$ (e.g., a subsequent second time), the difference between $t_j$ and $t_i$ is the period of replication. To build the snapshot $s_j$ on the secondary node, those data objects 402 that got modified between $t_i$ and $t_j$ need to be transferred from the primary node to the secondary node.

Figure 5:
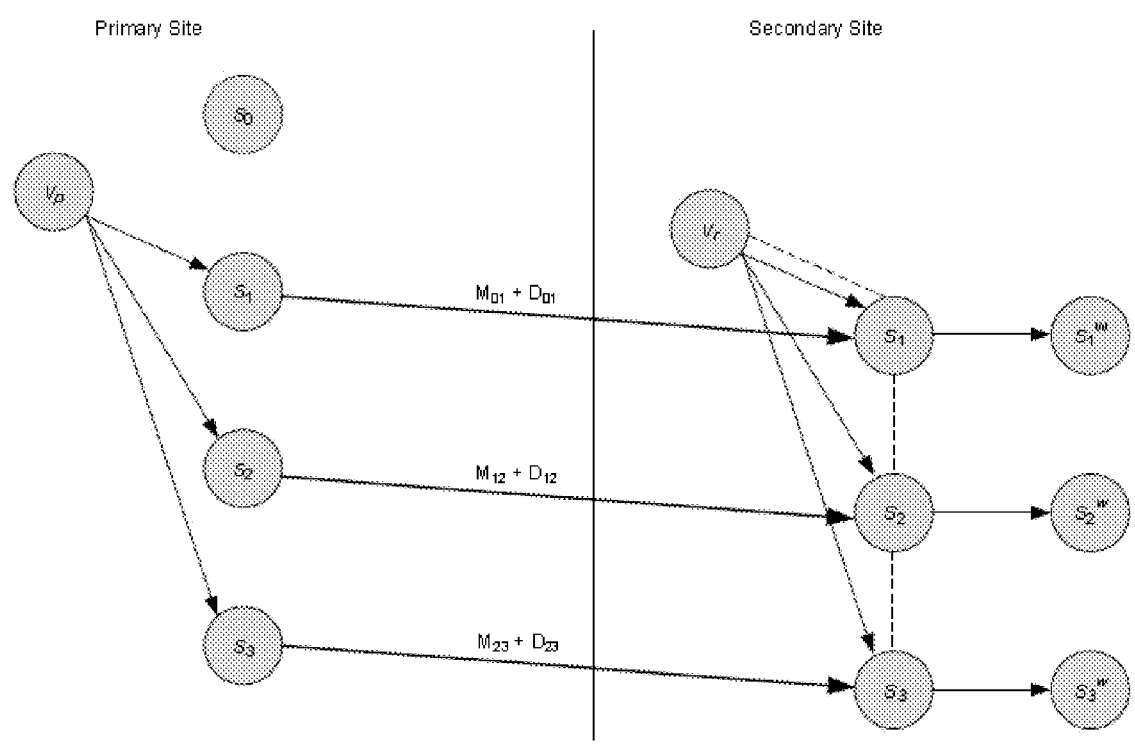
FIG. 5 shows a diagram of a replication snapshot chain process in accordance with one embodiment of the present invention.

FIG. 5 shows a diagram of a replication snapshot chain process 500 in accordance with one embodiment of the present invention.

Applications may need writable snapshot volumes on the secondary node. However, in one embodiment, applications are not allowed to update the blocks of the snapshot volumes because the subsequent snapshots may need to retrieve the original copy of these blocks by following the snapshot chain. The FIG. 5 embodiment shows an implementation providing write access to the applications on the secondary node. To provide a writable snapshot, $s_1$ is treated as a read only volume and a writable snapshot of this volume denoted by $s_1^w$ is created. Since $s_1$ is a read-only volume, there will be no copy-on-write operation from $s_1$ to $s_1^w$. Therefore, $s_1^w$ will include only the blocks that are updated by the application.

This aspect is illustrated in FIG. 5. FIG. 5 illustrates how to replicate an existing volume $v_p$ and its snapshots taken after replication is set up between the primary node and the secondary node. In the FIG. 5 illustration, dashed lines represent the snapshot chain on the secondary. Light arrows indicate the snapshots of a volume. Dark arrows show replication from a snapshot volume to another.

In one embodiment, the process starts with creating the corresponding replica volume $v_r$ on the secondary node. Then the very first snapshot of $v_p$ on the primary site is taken at $t_1$, which is $s_1$. In one embodiment, it is assumed that an imaginary snapshot $s_0$ exists but it is empty. Then $D_{01}$ corresponds to the content of $v_p$ at $t_1$, i.e, $s_1$. If $v_p$ is thinly provisioned then $M_{01}$ would be the set of blocks that are allocated at $t_1$. In one embodiment, a smaller $M_{01}$ can be obtained if the blocks that are actually used by the application are identified, for example, using the file system interfaces. If none of these is available then $M_{01}$ would be the set of all blocks reserved for $v_p$.

The primary node then transfers $M_{01}$ to the secondary node. Upon noticing the transfer of $M_{01}$ the secondary creates the first snapshot of $v_r$ which is called $s_1$ too since it will be synchronized with the $s_1$ on the primary. The reason for establishing a snapshot relation between $v_r$ and $s_1$ on the secondary site is to allow $s_1$ to be rolled forward to $v_r$ when $s_1$ is fully synchronized.

When $M_{01}$ is completely transferred, a writable snapshot of $s_1$ is taken on the secondary site, which is denoted by $s_1^w$. At this moment, an application can be mounted on $s_1^w$. A read operation from the application is first attempted to be served by $s_1^w$. If $s_1^w$ does not include the blocks to be read then they are read from $s_1$. A write operation on $s_1^w$ simply means allocating the blocks for the write operation (e.g., if these blocks have not been allocated already because of an earlier write operation) and updating their content directly on $s_1^w$.

After $M_{01}$ is replicated, the replication for $D_{01}$ is initiated. The contents for the blocks pointed by $M_{01}$ are read from $s_1$ on the primary. While this replication is in progress, a new snapshot of $v_p$ can be taken at time $t_2$. This will be $s_2$. $M_{12}$ are the set of blocks that have been updated on $v_p$ from $t_1$ to $t_2$.

Similarly, the transfer of $M_{12}$ results in taking another snapshot of $V_r$, which is $s_2$ on the secondary node. After $M_{12}$ is replicated, a writable snapshot of $s_2$ is taken on the secondary site, denoted by $s_2^w$, and the replication of $D_{12}$ is initiated on the primary site. $D_{12}$ is constructed by reading the blocks (pointed by $M_{12}$) from $s_2$. This process is repeated for subsequent snapshots taken on the primary, as shown in FIG. 6.

Figure 6:
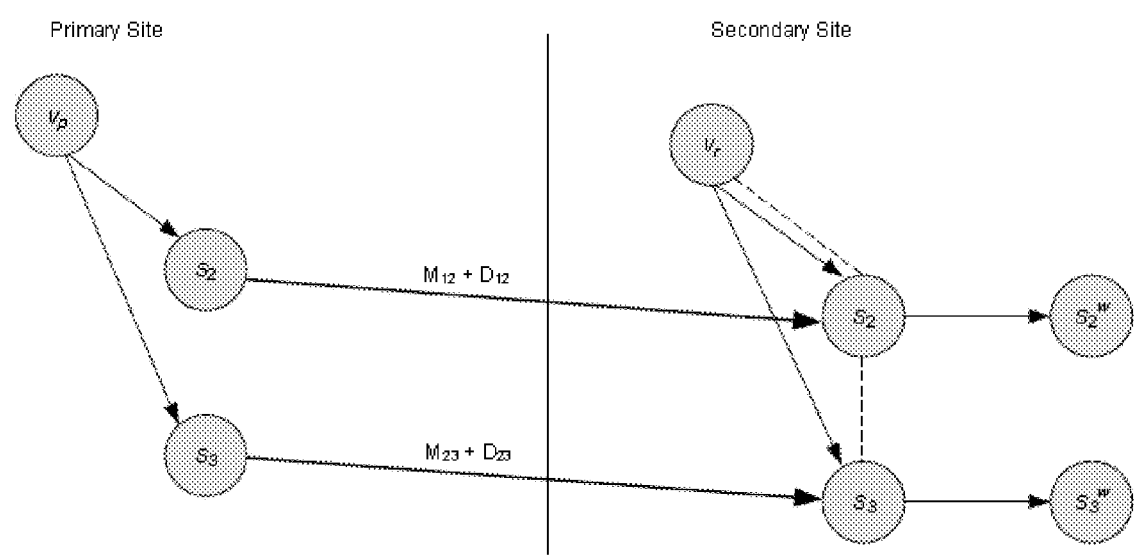
FIG. 6 shows a diagram of a replication snapshot chain process subsequent to a roll forward in accordance with one embodiment of the present invention.

FIG. 6 shows a diagram of a replication snapshot chain process 600 subsequent to a roll forward in accordance with one embodiment of the present invention. When a snapshot is completely replicated to the secondary site, it can be rolled forward to $v_r$ to reduce the number of volumes to manage, and to delete the snapshots that are no longer needed. FIG. 6 illustrates the snapshot chain after deleting $s_1$, in accordance with a roll forward.

Figure 7:
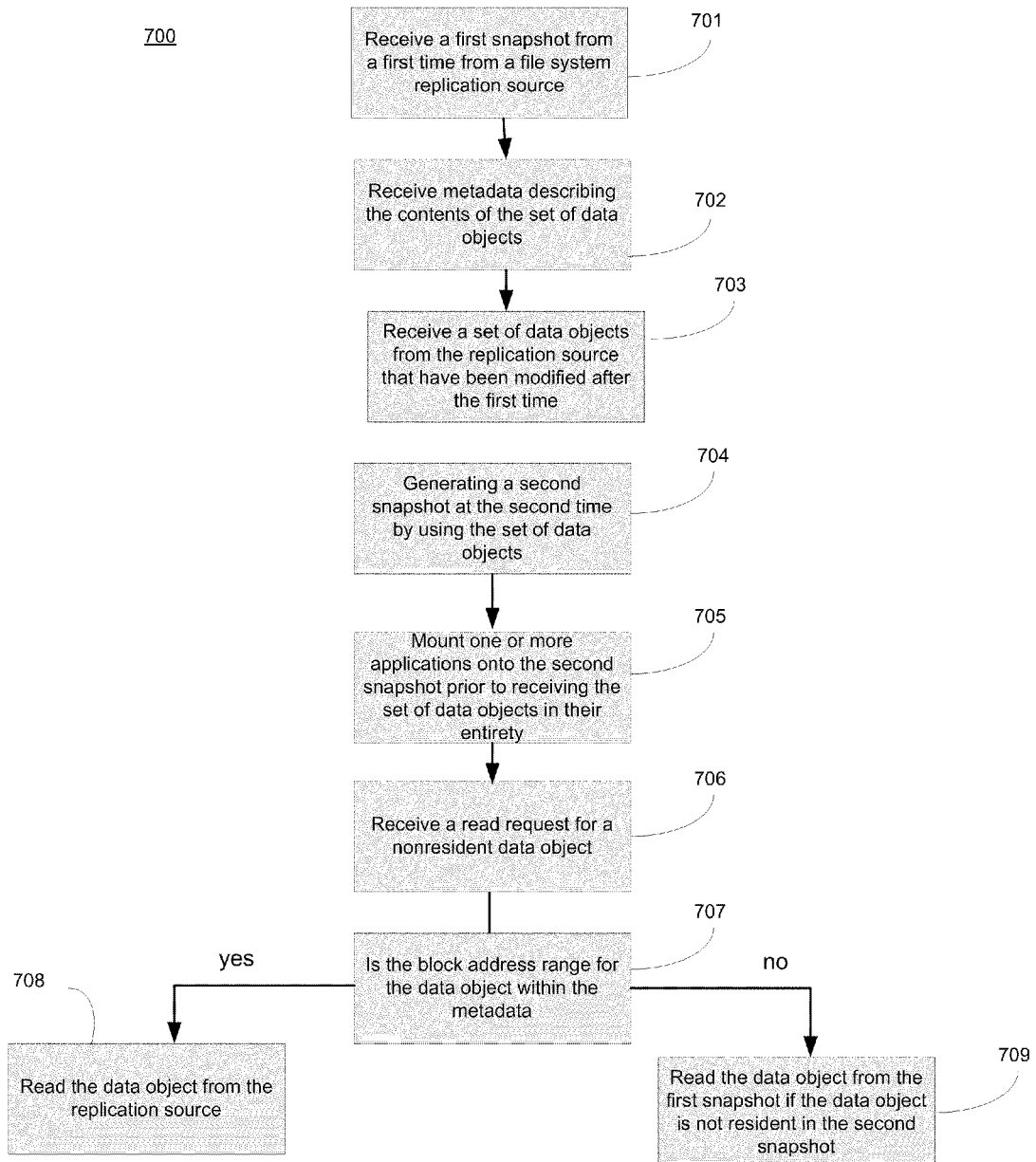
FIG. 7 shows a flowchart of the steps of a partial replication process in accordance with one embodiment of the present invention.

FIG. 7 shows a flowchart of the steps of a partial replication process 700 in accordance with one embodiment of the present invention. As depicted in FIG. 7, process 700 shows exemplary operating steps involved in mounting an application upon a partially replicated snapshot.

Process 700 begins in step 701, where a first snapshot is received at a first time on a replication source. In step 702, metadata describing the contents of the set of data objects is received. As described above, the metadata is much smaller in size than the actual data comprising the modified data objects. Because of this, the metadata is received much more quickly. In step 703, a set of data objects from the replication source are received. As described above, the set of data objects comprises those data objects that have been modified during a time period between the first time and a subsequent second time. In step 704, a second snapshot is generated at the second time on the replication source by using the set of data objects. In step 705, an application is mounted onto the second snapshot prior to receiving the set of data objects in their entirety. In step 706, a read request is received for a nonresident data object. In step 707, a determination is made as to whether the block address range for the data object is within the metadata (Mij). In step 708, if yes, then the data object is read from the replication source. In step 709, if not, the data object is retrieved from the first snapshot.

Figure 8:
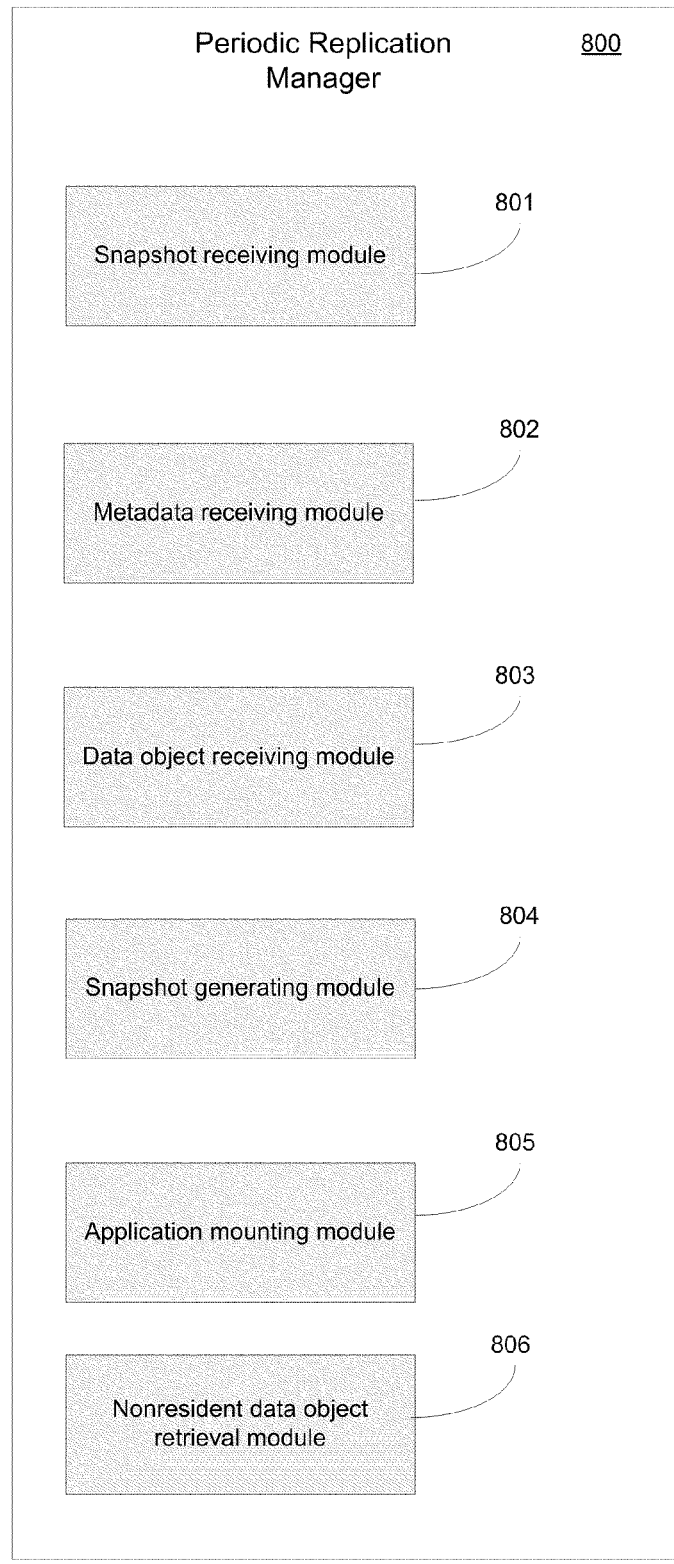
FIG. 8 shows a diagram of the various modules comprising a snapshot manager in accordance with one embodiment of the present invention.

FIG. 8 shows a diagram of the various modules comprising a periodic replication manager 800 in accordance with one embodiment of the present invention. As depicted in FIG. 8, periodic replication manager 800 shows the computer instantiated modules that provide functionality regarding the mounting of an application upon a partially replicated snapshot.

The periodic replication manager 800 includes a snapshot receiving module 801 which functions by receiving snapshots of a replication source. A metadata receiving module 802 receives metadata describing the contents of the set of data objects. A data object receiving module 803 receives a set of data objects from the replication source. A snapshot generating module 804 generates snapshots on the file system replication source by using the set of data objects. The application mounting module 805 mounts applications onto snapshots prior to receiving the set of data objects in their entirety. The non-resident data object retrieval module 806 functions by retrieving nonresident data objects and their accessed by an application.

Figure 9:
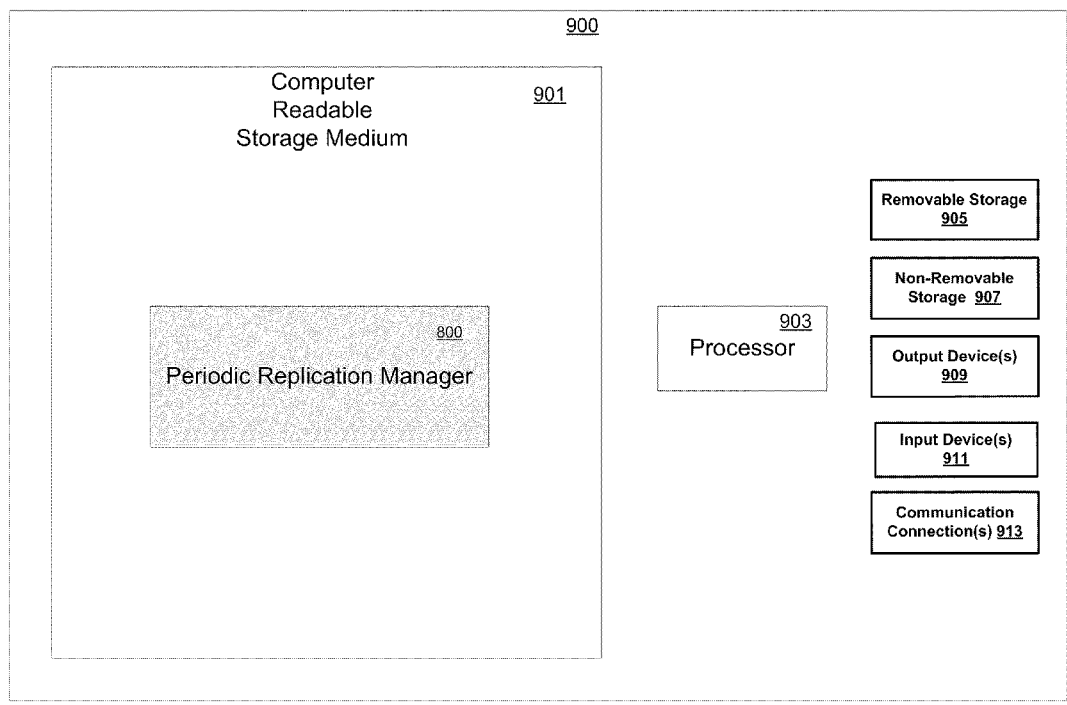
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the replication manager 800 and one or more software stacks from FIG. 1 are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and a computer readable storage medium 901. Depending on the exact configuration and type of computer system 900 that is used, memory 901 can be volatile (e.g., such as DRAM, etc.) 901$a$, non-volatile 901$b$ (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

Figure 10:
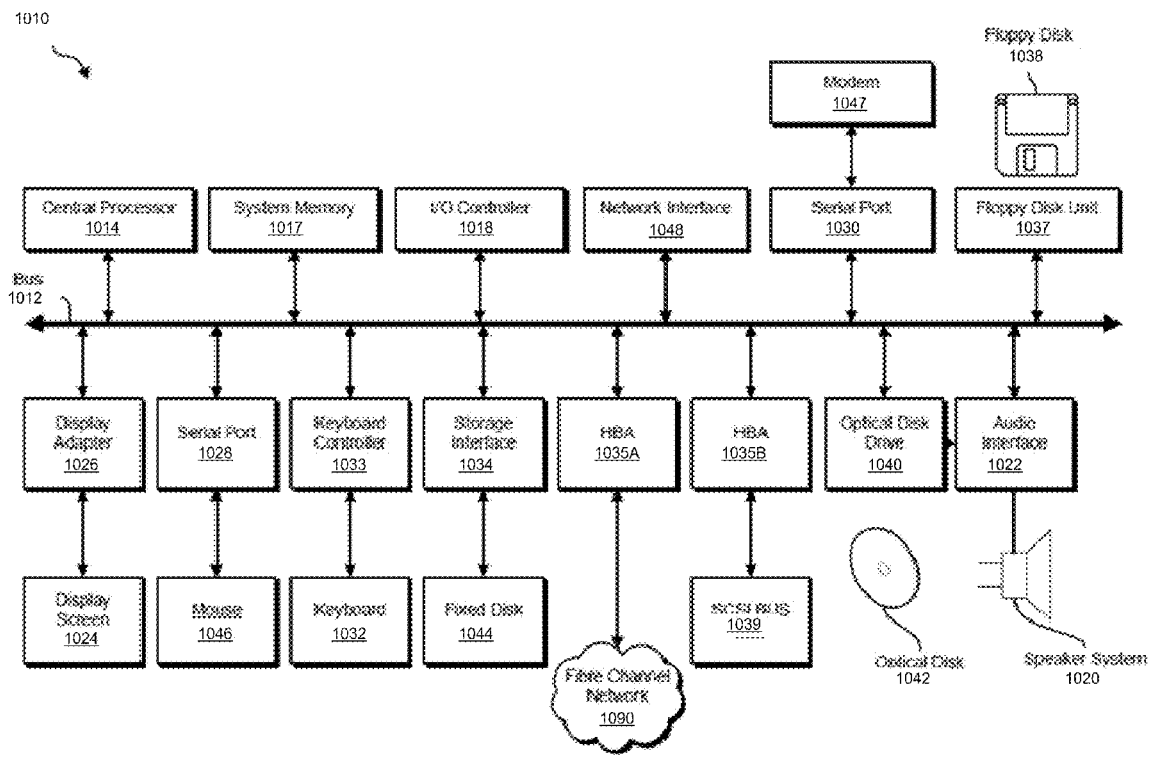
FIG. 10 depicts a block diagram of a computer system suitable for implementing certain functionality in accordance with one embodiment of the present invention.

FIG. 10 depicts a block diagram of a computer system 1010 suitable for implementing certain functionality in accordance with one embodiment of the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A partial replication snapshot method, comprising:
   receiving at a replication destination a first snapshot at a first time from a data object replication source;
   partially receiving at the replication destination a set of data objects from the replication source that have been modified during a time period between the first time and a subsequent second time;
   generating a second snapshot at the second time at the replication destination by using the partially received set of data objects; and
   mounting an application onto the second snapshot at the replication destination prior to fully receiving the set of data objects from the replication source.

2. The method of claim 1, wherein upon receiving a read request from the application to access one of the set of data objects and said one data object is not resident with the second snapshot, retrieving said one data object from the first snapshot.

3. The method of claim 2, wherein read accesses from the application to the said one data object are paused until said one data object is retrieved from the first snapshot.

4. The method of claim 1, wherein upon receiving a read request from the application to access one of the set of data objects and said one data object is yet to be transferred by the replication source, retrieving said one data object from the replication source via an out of order transfer.

5. The method of claim 1, wherein metadata is used to identify the set of data objects from the replication source that have been modified.

6. The method of claim 5, wherein the metadata comprises changed block address ranges.

7. The method of claim 1, wherein metadata describing the set of data objects is received prior to receiving the set of data objects in their entirety.

8. A computer readable storage medium having stored thereon, computer executable instructions that, if executed by a computer system cause the computer system to perform a method comprising:
   receiving at a replication destination a first snapshot at a first time from a replication source;

partially receiving at the replication destination a set of data objects from the replication source that have been modified during a time period between the first time and a subsequent second time;

generating a second snapshot at the second time at the replication destination by using the partially received set of data objects; and mounting an application onto the second snapshot at the replication destination prior to fully receiving the set of data objects from the replication source.

9. The computer readable storage medium of claim 8, wherein upon receiving a read request from the application to access one of the set of data objects and said one data object is not resident with the second snapshot, retrieving said one data object from the first snapshot.

10. The computer readable storage medium of claim 9, wherein read accesses from the application to the said one data object are paused until said one data object is retrieved from the first snapshot.

11. The computer readable storage medium of claim 8, wherein metadata is used to identify the set of data objects from the replication source that have been modified.

12. The computer readable storage medium of claim 11, wherein the metadata comprises changed block address ranges.

13. The computer readable storage medium of claim 11, wherein metadata describing the set of data objects is received prior to receiving the set of data objects in their entirety.

14. The computer readable storage medium of claim 8, wherein a third snapshot is generated and an application is mounted on the third snapshot prior to completion of the third snapshot.

15. A volume replication system, comprising:

a computer system having a processor coupled to a computer readable storage media and executing computer readable code which causes the computer system to implement a checkpoint manager module, wherein the checkpoint manager module:

receives at a replication destination a first snapshot at a first time from a replication source;

partially receives at the replication destination a set of data objects from the replication source that have been modified during a time period between the first time and a subsequent second time;

generates a second snapshot at the second time at the replication destination by using the partially received set of data objects; and allows an application to use the second snapshot at the replication destination prior to fully receiving the set of data objects from the replication source.

16. The system of claim 15, wherein upon receiving a read request from the application to access one of the set of data objects and said one data object is not resident with the second snapshot, retrieving said one data object from the first snapshot.

17. The system of claim 16, wherein write accesses from the application to the said one data object are implemented by using a writable snapshot of the second snapshot.

18. The system of claim 15, wherein metadata comprising changed block address ranges is used to identify the set of data objects from the replication source that have been modified.

19. The system of claim 18, wherein metadata describing the set of data objects is received prior to receiving the set of data objects in their entirety.

20. The system of claim 15, wherein a third snapshot is generated and an application is mounted on the third snapshot prior to completion of the third snapshot.

* * * * *